(12) United States Patent
Rossiter (10) Patent No.: US 12,246,683 B2
(45) Date of Patent: Mar. 11, 2025

(54) ROOF MOUNTED RACK OF RECREATIONAL SPORT VEHICLE

(71) Applicant: Timothy Rossiter, Pomona, NY (US)

(72) Inventor: Timothy Rossiter, Pomona, NY (US)

( * ) Notice: Subject to any disclaimer, the term of this patent is extended or adjusted under 35 U.S.C. 154(b) by 105 days.

(21) Appl. No.: 17/988,231

(22) Filed: Nov. 16, 2022

(65) Prior Publication Data

US 2024/0157884 A1 May 16, 2024

(51) Int. Cl.
*B60R 9/06* (2006.01)

(52) U.S. Cl.
CPC ............................. *B60R 9/06* (2013.01)

(58) Field of Classification Search
CPC ........................................................ B60R 9/06
USPC ......................................................... 224/309
See application file for complete search history.

(56) References Cited

U.S. PATENT DOCUMENTS

| | | | | |
|---|---|---|---|---|
| 4,065,041 | A * | 12/1977 | Stegavig | B60R 9/00 296/3 |
| 4,773,575 | A * | 9/1988 | Morrison, III | B60R 9/00 296/37.6 |
| 10,207,650 | B1 * | 2/2019 | Banegas | B60R 9/06 |
| 10,214,151 | B1 * | 2/2019 | Lindsay | A47B 13/003 |
| 10,940,803 | B2 * | 3/2021 | Ni | B60R 9/058 |
| 11,525,604 | B1 * | 12/2022 | Delgado-Nanez | F24S 30/428 |
| 11,679,724 | B2 * | 6/2023 | Dayani | B60R 9/052 224/309 |
| 11,731,564 | B1 * | 8/2023 | Strawn | B60R 9/00 296/3 |
| 2015/0197202 | A1 * | 7/2015 | Harrison | B60R 9/06 296/3 |
| 2016/0059906 | A1 * | 3/2016 | Leitner | B62D 33/0207 296/3 |
| 2017/0166105 | A1 * | 6/2017 | Puchkoff | B60R 9/06 |
| 2018/0215321 | A1 * | 8/2018 | Allen | B60R 9/00 |
| 2019/0092213 | A1 * | 3/2019 | Beenen | B60N 2/2245 |
| 2019/0283684 | A1 * | 9/2019 | Singer | B60R 9/065 |
| 2021/0039721 | A1 * | 2/2021 | Foreman | B60R 9/045 |
| 2022/0219765 | A1 * | 7/2022 | Reyes | B62D 33/04 |
| 2023/0062166 | A1 * | 3/2023 | Beenen | B60R 5/04 |
| 2023/0108330 | A1 * | 4/2023 | Azzam | B60R 9/06 224/405 |
| 2023/0286444 | A1 * | 9/2023 | Kuschmeader | B60R 9/00 |
| 2024/0010135 | A1 * | 1/2024 | Elder | B60R 9/06 |

FOREIGN PATENT DOCUMENTS

KR 1019980047591 A 9/1998

* cited by examiner

*Primary Examiner* — Peter N Helvey
(74) *Attorney, Agent, or Firm* — You & IP, LLC (57) ABSTRACT

A roof mounted rack for a recreational sport vehicle mounted on a rear fender of the recreational sport vehicle is proposed. Brackets are screwed on both sides of the rear fender of the recreational sport vehicle, a roof rack is mounted on upper portions of the brackets, and the roof rack includes a roof zone on a top thereof and side zones on both sides thereof. Thus, the roof rack is mounted on the upper portion of the bracket to surround a trunk space in an arch shape, so it is possible to utilize the trunk space itself, and it is possible to utilize a space in three dimensions by mounting various pieces of recreation equipment such as a bike, skis, a kayak, or a board on a roof zone and both side zones of the roof rack.

8 Claims, 6 Drawing Sheets

ROOF MOUNTED RACK OF RECREATIONAL SPORT VEHICLE

BACKGROUND OF THE INVENTION

Field of the Invention

The present disclosure relates to a roof mounted rack that is mounted on a rear fender of a recreational sport vehicle such as a BRONCO or a Sport Utility Vehicle (SUV). More particularly, the present disclosure relates to a roof mounted rack of a recreational sport vehicle, in which the rack can be installed so as to minimize damage or deformation to a vehicle structure, and it is easy to mount and dismount various pieces of recreational equipment.

Description of the Related Art

In a recreational sport vehicle, a rack is installed on the upper roof or rear of a vehicle body for the purpose of holding various pieces of equipment such as a bike, skis, a kayak, or a board.

Generally, in the case of a recreational sport vehicle or a SUV, various pieces of equipment are held by a basket installed on the upper roof of the vehicle body, or a separate rack is installed on the roof or rear to hold a bike, skis, a kayak, a board, etc.

As a related art, Korean Patent Laid-Open Publication No. 10-1998-0047591 has been proposed. According to the cited document, a spare tire carrier having a ski holder is provided on a roof or back door of a jeep. However, this is problematic in that equipment may be held only for a restricted range and purpose, but various pieces of equipment may not be held flexibly and in three dimensions.

Moreover, a conventional roof rack for a recreational sport vehicle is problematic in that it is inconvenient for a user to climb to the top of the vehicle through a ladder extended at the rear so as to mount or dismount equipment, and the equipment may fall or the vehicle may be damaged by a user in the process of mounting or dismounting the equipment.

Further, most of recreational sport vehicles or SUVs are problematic in that a hole is artificially processed or formed in a vehicle body so as to install a rack, thus inevitably causing damage to the vehicle body.

SUMMARY OF THE INVENTION

Accordingly, the present disclosure has been made keeping in mind the above problems occurring in the related art, and an objective of the present disclosure is to provide a roof mounted rack of a recreational sport vehicle, in which a roof rack for carrying a board, skis, a bike, etc. is installed on a rear fender of the vehicle without damaging a vehicle body of the recreational sport vehicle or while minimizing the damage, so it is possible to utilize a rear trunk space of the vehicle, and it is possible to utilize a space in three dimensions by additionally mounting various pieces of equipment such as a bike, skis, a kayak, or a board, and it is easy to mount or dismount equipment without the necessity of climbing the vehicle body.

In order to achieve the objective of the present disclosure, the present disclosure provides a roof mounted rack for a recreational sport vehicle mounted on a rear fender of the recreational sport vehicle, wherein brackets are screwed on both sides of the rear fender of the recreational sport vehicle, a roof rack is mounted on upper portions of the brackets, and the roof rack includes a roof zone on a top thereof and side zones on both sides thereof.

The bracket may include a web that is integrally provided on a side of the flange contacting the rear fender of the recreational sport vehicle so that the roof rack is screwed thereto, a plurality of screw holes may be formed in the flange, and first and second through holes may be formed in both ends of front and rear portions of the web.

The roof rack may be made by transversely connecting a front arch bar and a rear arch bar via a plurality of cross bars to define the roof zone and the side zones, the cross bar of the roof zone and an uppermost cross bar of the side zone may extend rearwards to be bent and be connected to a rear reinforcement arch bar, thus defining a rear zone, and a first coupling hole and a second coupling hole corresponding to the first through hole and the second through hole formed in the web of the bracket may be formed in both ends of a lower cross bar of the side zone.

A seat groove may be formed between the flange and the web of the bracket to be stepped downwards, so the roof rack may be seated thereon.

A brass oil embedded sleeve bearing may be provided in each of the first through hole and the second through hole formed in front and rear ends of the web of the bracket.

A lower cross bar provided on each of the lower ends of both sides of the roof rack in a widthwise direction may contact an inner surface of the web of the bracket while the roof rack is seated on the seat groove of the bracket, so a first screw and a second screw passing through the first through hole and the second through hole formed in both ends of the web may be screwed to the first coupling hole and the second coupling hole of the lower cross bar of the side zone of the roof rack.

The first through hole formed in the front portion of the web of the bracket may be used for coupling and separation, and the second through hole formed in the rear portion thereof may serve as a pivot hinge shaft, so the first screw may be unscrewed from the first through hole of the web, thus allowing the roof rack to be tilted back about the second screw in the second through hole formed in the rear portion of the web, as the pivot hinge shaft.

Each of the first screw and the second screw used in the first through hole and the second through hole of the web of the bracket may be a plastic knob with a seven arm grip.

Further, bumper brackets may be provided on vertical portions of both sides of the front arch bar of the roof rack to protrude to one side, and a rubber bumper may be provided on the inside of each of the bumper brackets, the rubber bumper being a rubber bumper stabilizer.

A roof mounted rack A for a recreational sport vehicle according to the present disclosure is advantageous in that a roof rack is mounted on an upper portion of a bracket to surround a trunk space in an arch shape, so it is possible to utilize the trunk space itself, and it is possible to utilize a space in three dimensions by mounting various pieces of recreation equipment such as a bike, skis, a kayak, or a board on a roof zone and both side zones of the roof rack.

Further, the present disclosure is advantageous in that a screw hole is formed in a flange of a bracket contacting a rear fender of a sport vehicle to correspond to a hole formed in the fender, so they can be simply fastened with a screw, thereby affording convenient installation, and the present disclosure can be flexibly applied merely by machining the screw hole in the flange using a hole present in a vehicle body.

Furthermore, it is possible to prevent a vehicle body from being damaged or deformed in the installation process of a roof rack, and it is possible to minimize damage to the vehicle body even if some hole processes occur.

Moreover, the present disclosure is advantageous in that a pivot hinge shaft passing through a web of a bracket is provided so that a roof rack may be tilted back when necessary, thus allowing a user to easily mount or dismount equipment without the necessity of climbing a vehicle body.

DETAILED DESCRIPTION OF THE INVENTION

Hereinafter, the preferred embodiment of the present disclosure will be described in detail with reference to the accompanying drawings.

Figure 1:
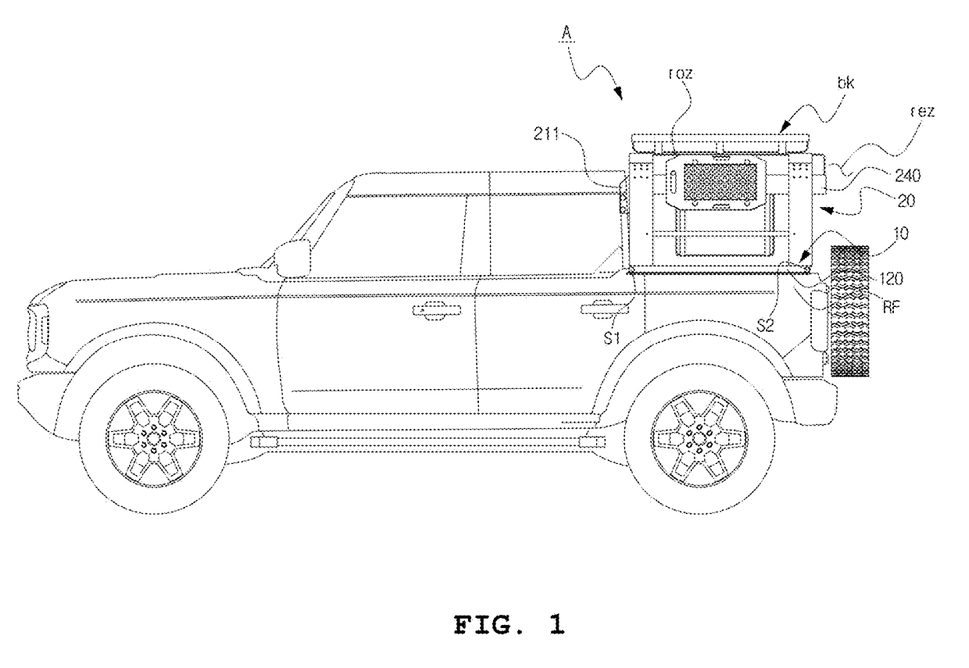
FIG. 1 is a diagram illustrating the using state of a sport vehicle equipped with a roof mounted rack according to an embodiment of the present disclosure.

FIG. 1 is a diagram illustrating the using state of a sport vehicle equipped with a roof mounted rack A according to an embodiment of the present disclosure. The roof mounted rack A, which is the subject of the present disclosure, is mounted and installed on a rear fender of a recreational sport vehicle such as a BRONCO or a Sport Utility Vehicle (SUV).

Meanwhile, the present disclosure may be applied to any type of vehicle as long as it is a hatchback type vehicle having a trunk space at a rear thereof. To be more specific, although the present disclosure may be easily applied to a vehicle having a rear trunk of a soft top type, the present disclosure may be applied by slightly changing a structure even in the case of a hard top. In addition, the present disclosure may be applied to a vehicle having no top.

The present disclosure is proposed to provide a roof mounted rack A of a recreational sport vehicle, in which the roof rack can be installed so as to minimize damage or deformation to a vehicle structure, and it is easy to mount and dismount various pieces of recreational equipment. Brackets 10 are screwed on both sides of a rear fender RF of the recreational sport vehicle, and a roof rack 20 is mounted on upper portions of the brackets 10.

Here, a plurality of holes is formed in the rear fender RF of the sport vehicle, and a plurality of screw holes SH is also formed in a flange 110 of the bracket 10 at positions corresponding to the holes, so they may be simply fastened with screws, and thereby installation is convenient. Further, the present disclosure may be flexibly applied merely by machining the screw holes in the flange using holes present in a vehicle body.

Figure 3:
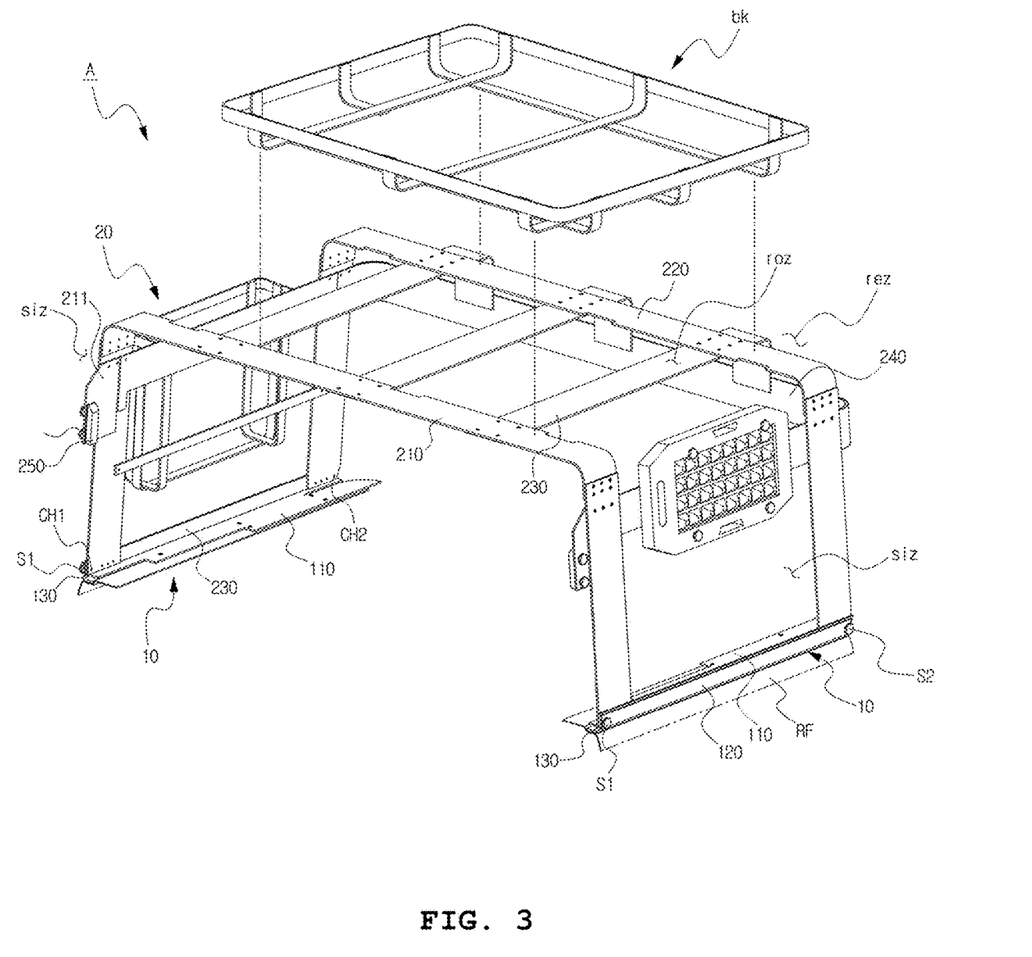
FIGS. 3 and 4 are perspective views illustrating the roof mounted rack according to an embodiment of the present disclosure, when it is seen from a front and a rear.
Figure 4:
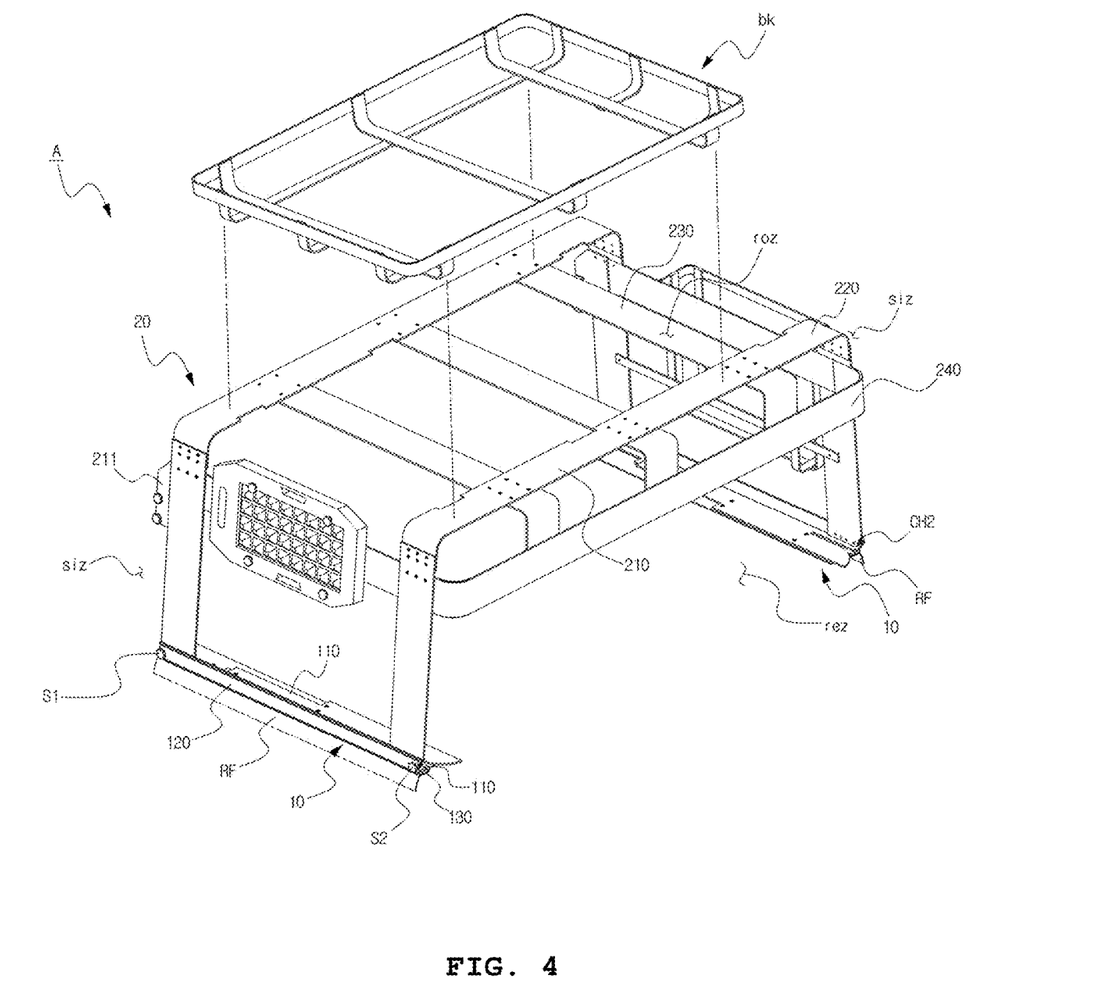

Further, as shown in FIGS. 3 and 4, the roof rack 20 mounted on the bracket 10 is formed in an arch shape to surround a rear trunk. A roof zone roz is provided on a top of the roof rack, and side zones siz are provided on both sides of the roof rack. Thus, various pieces of recreation equipment such as a bike, skis, a kayak, or a board may be held in the space of the trunk itself as well as the roof zone roz and both side zones siz of the roof rack 20, thus allowing the space to be effectively utilized in three dimensions.

According to an embodiment, a luggage, a ladder, a kayak, a tent, a bike, a fishing rod vault, skis, a snowboard, a surfboard, and an accessory may be mounted on the roof zone roz of the roof rack 20, and an accessory such as a beach chair, a rescue board, or a water tank may be mounted on the side zones siz provided on both sides of the roof rack.

Moreover, the roof zone roz may be provided with a basket bk so as to safely install a luggage, a tent, a ladder, etc.

Specifically, a web 120 to which the roof rack 20 is screwed may be integrally provided on a side of the flange 110 that is in contact with the rear fender RF, and a first through hole SH1 and a second through hole SH2 may be formed in both ends of front and rear portions of the web 120. At this time, a first screw S1 and a second screw S2 may pass through the first through hole SH1 and the second through hole SH2, respectively, to be fastened to the roof rack 20.

Further, a longitudinal spacer SP may be installed on the outside of a stepped portion of the rear fender RF of the recreational sport vehicle with which the flange 110 of the bracket contacts. As the rear fender RF is stepped on the outside, the spacer SP serves to sufficiently withstand load caused by equipment installed on the roof rack 20 and to prevent the rear fender RF from being scratched.

Moreover, according to an embodiment, the spacer SP may be provided on a lower surface of the flange 110 at a position corresponding to the stepped portion of the rear fender RF. This can prevent a vehicle body from being damaged or deformed during the installation of the roof rack, or minimize damage to the vehicle body even if some hole processes occur.

To be more specific, as shown in FIGS. 3 and 4, the roof rack may be made by transversely connecting a front arch bar 210 and a rear arch bar 220 via a plurality of cross bars 230 to define the roof zone roz and the side zones siz.

Further, the cross bar 230 of the roof zone roz and the uppermost cross bar 230 of the side zone siz extend rearwards to be bent and be connected to a rear reinforcement arch bar 240, thus defining a rear zone rez. A first coupling hole CH1 and a second coupling hole CH2 corresponding to the first through hole SH1 and the second through hole SH2 formed in the web 120 of the bracket 10 may be formed in both ends of a lower cross bar 230 of the side zone siz.

Since various pieces of recreation equipment may be held by the rear zone rez as well as the roof zone roz and the side zones siz, it is possible to utilize the space in three dimensions.

On the other hand, a rack notch may be further provided in each of the front arch bar 210 and the rear arch bar 220 forming the roof zone roz. This prevents an accessory installed in the roof zone roz from slipping.

Further, a brass oil embedded sleeve bearing is provided in each of the first through hole SH1 and the second through hole SH2 formed in the front and rear ends of the web 120 of the bracket 10, thus preventing the corrosion of the fastened first and second screws S1 and S2 or the first and second through holes SH1 and SH2, and realizing stable fastening and separation.

Figure 6:
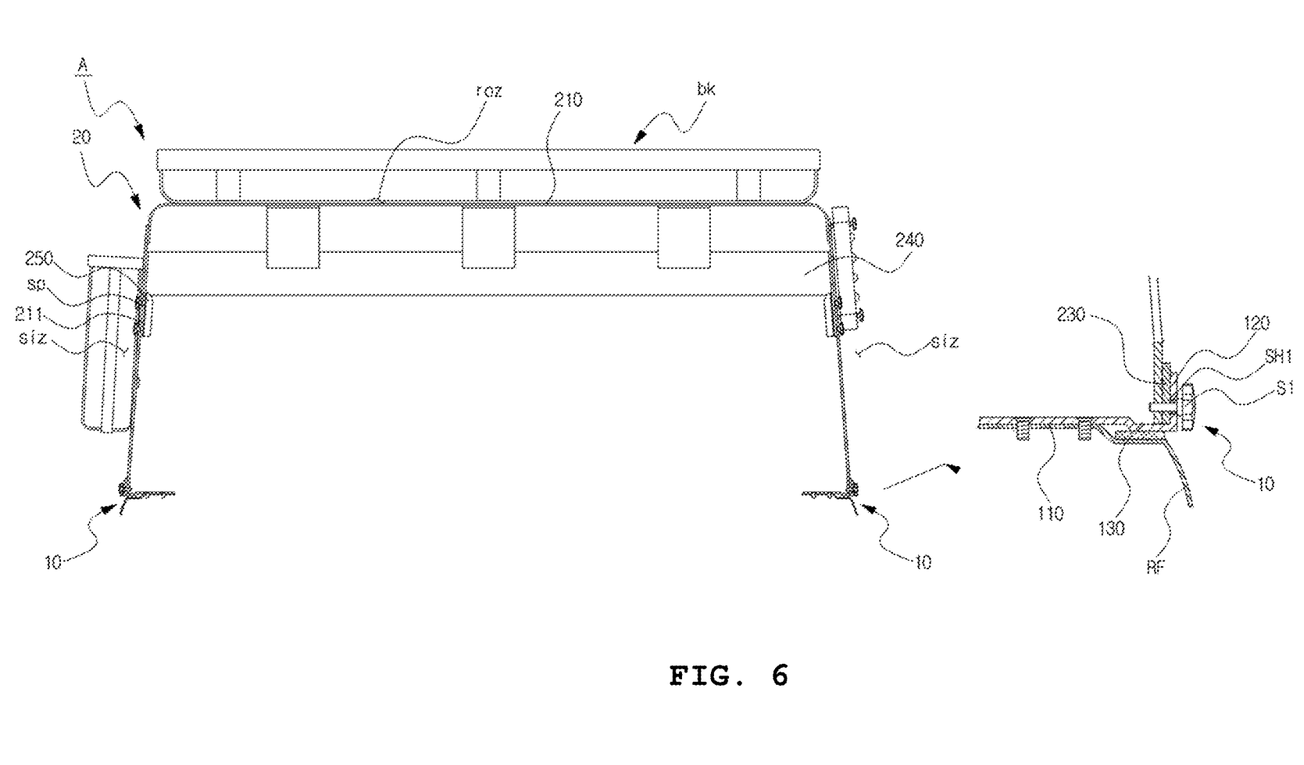
FIG. 6 is a sectional view illustrating the roof mounted rack according to an embodiment of the present disclosure.

As shown in FIG. 6, a seat groove 130 may be formed between the flange 110 and the web 120 of the bracket 10 to be stepped downwards, so the roof rack 20 is seated thereon. That is, the lower cross bar 230 provided on each of the lower ends of both sides of the roof rack 20 in a widthwise direction may be screwed while contacting the inner surface of the web 120 of the bracket 10, thus allowing the roof rack 20 to be stably secured to the seat groove 130 of the bracket 10 without undesirable movement or removal.

Figure 5:
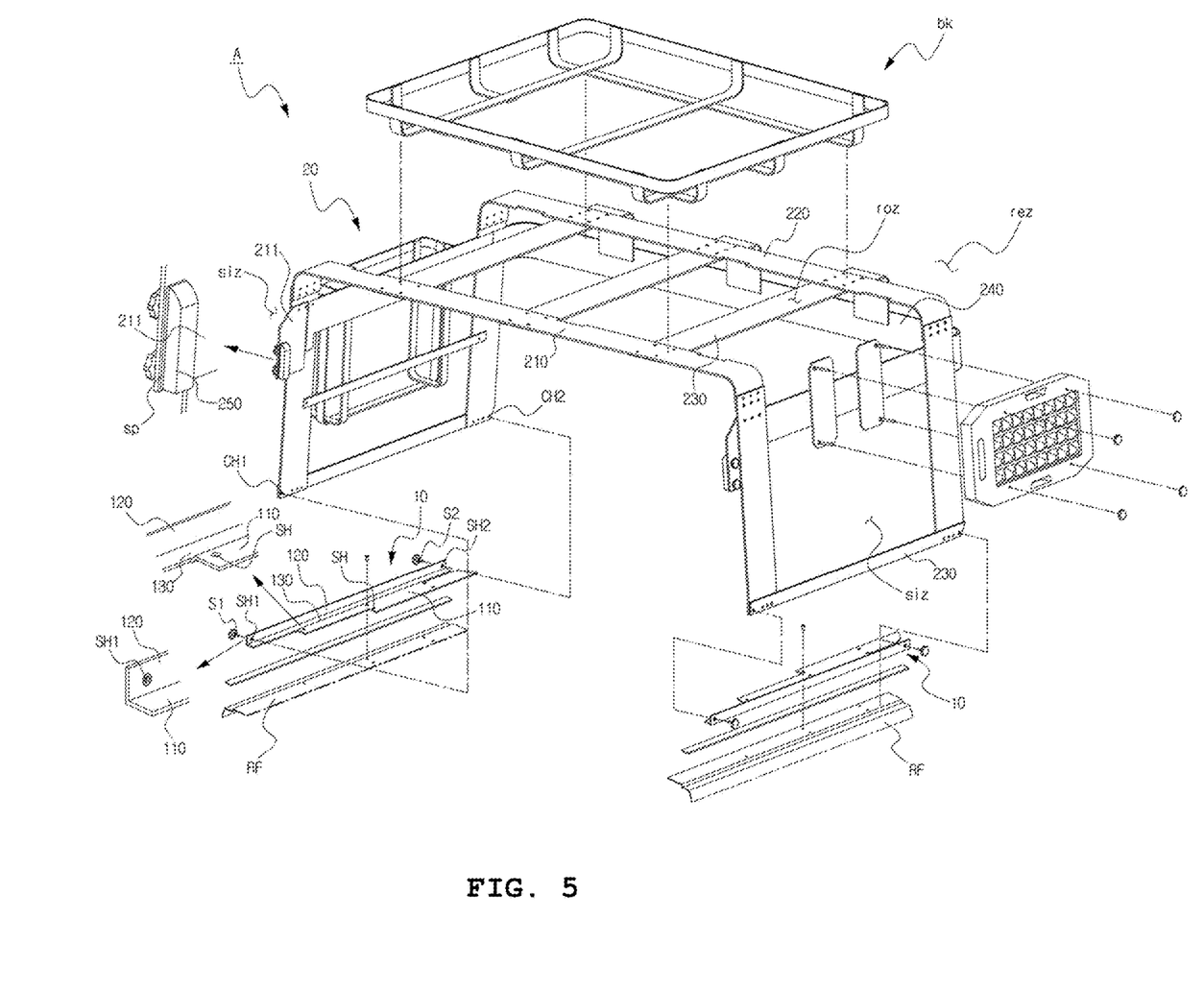
FIG. 5 is an exploded perspective view illustrating a bracket and a roof rack according to an embodiment of the present disclosure.

Further, as shown in FIG. 5, the lower cross bar 230 provided on each of the lower ends of both sides of the roof rack 20 in the widthwise direction contacts the inner surface of the web 120 of the bracket 10, so the first screw S1 and the second screw S2 passing through the first through hole SH1 and the second through hole SH2 formed in both ends of the web 120 may be screwed to the first coupling hole CH1 and the second coupling hole CH2 of the lower cross bar 230 of the side zone siz of the roof rack 20.

Figure 2:
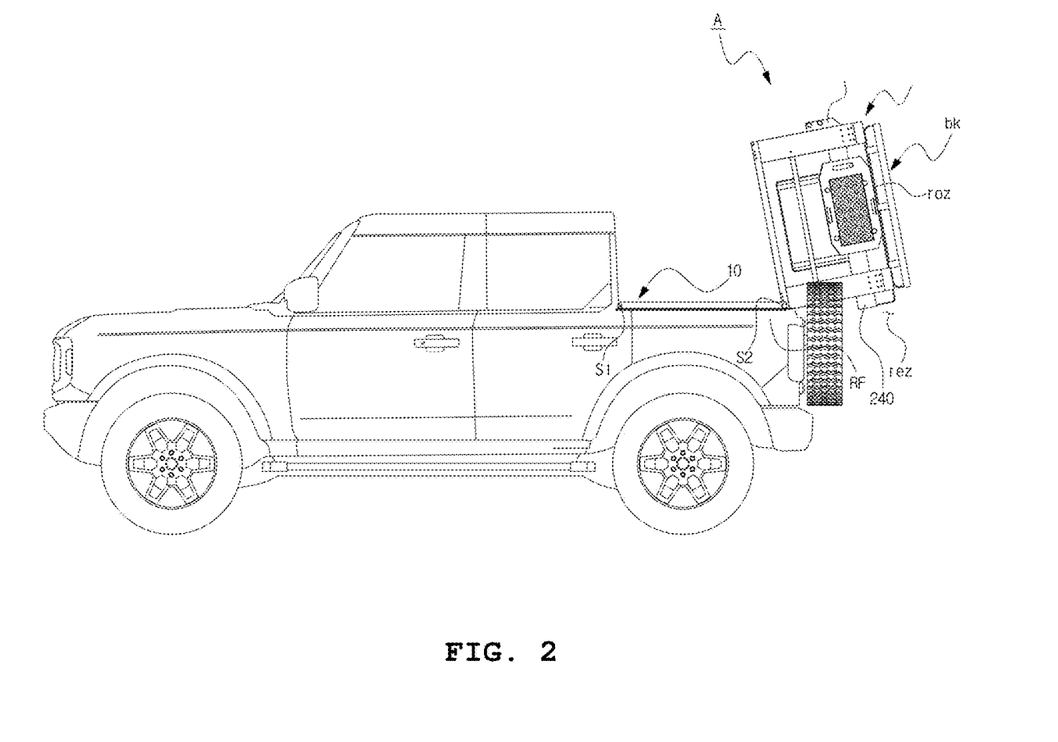
FIG. 2 is a diagram illustrating the using state in which a roof rack is tilted back about a pivot hinge shaft according to an embodiment of the present disclosure.

At this time, the first through hole SH1 formed in the front portion of the web 120 of the bracket 10 is used for coupling and separation, and the second through hole SH2 formed in the rear portion thereof serves as a pivot hinge shaft. Thus, the first screw S1 may be unscrewed from the first through hole SH1 formed in the front portion of the web 120, thus allowing the roof rack 20 to be tilted back about the second screw S2 in the second through hole SH2 formed in the rear portion of the web 120, as the pivot hinge shaft, as shown in FIG. 2. Each of the first screw S1 and the second screw S2 used in the first through hole SH1 and the second through hole SH2 of the web 120 of the bracket 10 may be a plastic knob with a seven arm grip.

Thus, even if a user does not climb the vehicle body in the process of mounting or dismounting equipment on or from the roof rack 20, the roof rack 20 rotates about the pivot hinge shaft, thus allowing the equipment to be easily mounted or dismounted.

Particularly, when the roof rack 20 is tilted back about the second screw hole SH2 formed in the rear portion of the web 120 of the bracket 10, as the pivot rotating shaft, the rear reinforcement bar 240 provided on the rear of the roof rack 20 is placed on a 5TH wheel (rear wheel) provided on the rear of the recreational sport vehicle. Rear lights may be provided on both sides on the rear of the rear reinforcement bar 240.

As shown in FIG. 5, bumper brackets 211 may be provided on vertical portions of both sides of the front arch bar 210 of the roof rack 20 to protrude to one side, and a rubber bumper 250 may be provided on the inside of each bumper bracket 211. The rubber bumper 250 may be a rubber bumper stabilizer.

Further, when the roof rack 20 is seated in the seat groove 130 of the bracket 10, each of the rubber bumpers 250 provided on upper portions of the vertical portions on both sides of the front arch bar 210 of the roof rack 20 contacts an upper portion of a door pillar trim. Preferably, a protection spacer is installed on the upper portion of the door pillar trim so as to prevent the door pillar trim from being damaged.

Although the present disclosure was described with reference to specific embodiments shown in the drawings, it is apparent to those skilled in the art that the present disclosure may be changed and modified in various ways without departing from the scope of the present disclosure, which is described in the following claims.

In the description of the present disclosure, detailed descriptions of known functions and configurations which are deemed to make the gist of the present disclosure obscure will be omitted. Since the terms can be differently defined according to the intention of a user or an operator or customs, these terms should be interpreted as having a meaning that is consistent with the technical spirit of the present disclosure. Therefore, it should be understood that those embodiments are not intended to limit the present disclosure to specific forms and they include all changes, equivalents or modifications included in the spirit and scope of the present disclosure.

What is claimed is:

1. A roof mounted rack for a recreational sport vehicle mounted on a rear fender of the recreational sport vehicle,
    wherein brackets are screwed on both sides of the rear fender of the recreational sport vehicle, a roof rack is mounted on upper portions of the brackets, and the roof rack comprises a roof zone on a top thereof and side zones on both sides thereof, and
    wherein the roof rack is made by transversely connecting a front arch bar and a rear arch bar via a plurality of cross bars to define the roof zone and the side zones, the cross bar of the roof zone and an uppermost cross bar of the side zone extend rearwards to be bent and be connected to a rear reinforcement arch bar, thus defining a rear zone, and a first coupling hole and a second coupling hole corresponding to the first through hole and the second through hole formed in the web of the bracket are formed in both ends of a lower cross bar of the side zone.

2. The roof mounted rack of claim 1, wherein the bracket comprises a web that is integrally provided on a side of a flange contacting the rear fender of the recreational sport vehicle so that the roof rack is screwed thereto, a plurality of screw holes is formed in the flange, and first and second through holes are formed in both ends of front and rear portions of the web.

3. The roof mounted rack of claim 2, wherein a seat groove is formed between the flange and the web of the bracket to be stepped downwards, so the roof rack is seated thereon.

4. The roof mounted rack of claim 2, wherein a brass oil embedded sleeve bearing is provided in each of the first through hole and the second through hole formed in front and rear ends of the web of the bracket.

5. The roof mounted rack of claim 3, wherein a lower cross bar provided on each of the lower ends of both sides of the roof rack in a widthwise direction contacts an inner surface of the web of the bracket while the roof rack is seated on the seat groove of the bracket, so a first screw and a second screw passing through the first through hole and the second through hole formed in both ends of the web are screwed to the first coupling hole and the second coupling hole of the lower cross bar of the side zone of the roof rack.

6. The roof mounted rack of claim 5, wherein the first through hole formed in the front portion of the web of the bracket is used for coupling and separation, and the second through hole formed in the rear portion thereof serves as a pivot hinge shaft, so the first screw is unscrewed from the first through hole of the web, thus allowing the roof rack to be tilted back about the second screw in the second through hole formed in the rear portion of the web, as the pivot hinge shaft.

7. The roof mounted rack of claim 5, wherein each of the first screw and the second screw used in the first through hole and the second through hole of the web of the bracket is a plastic knob with a seven arm grip.

8. The roof mounted rack of claim 5, wherein bumper brackets are provided on vertical portions of both sides of the front arch bar of the roof rack to protrude to one side, and a rubber bumper is provided on the inside of each of the bumper brackets, the rubber bumper being a rubber bumper stabilizer.

\* \* \* \* \*